Figure 1:
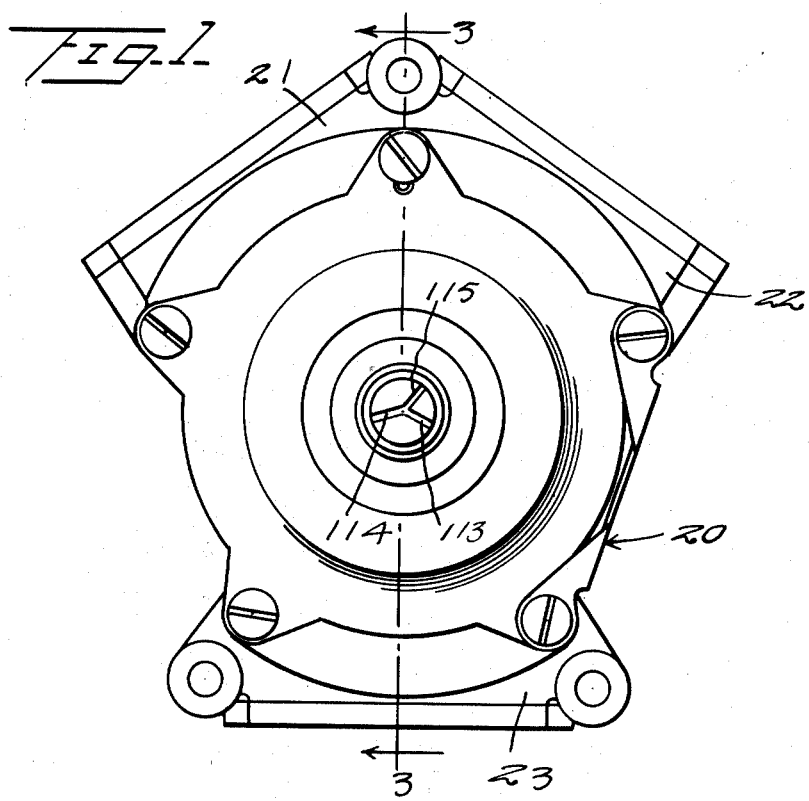

Dec. 30, 1952 G. T. DOWNEY 2,623,724
SEAT FOR ROTARY PLUG VALVES
Filed June 28, 1948 5 Sheets-Sheet 1

Inventor
G. T. Downey
By Kimmel & Crowell
Attorneys

Dec. 30, 1952 G. T. DOWNEY 2,623,724
SEAT FOR ROTARY PLUG VALVES
Filed June 28, 1948 5 Sheets-Sheet 2

Fig. 13

Fig. 15

Inventor
G. T. Downey
By Kimmel & Crowell
Attorneys

Dec. 30, 1952  G. T. DOWNEY  2,623,724
SEAT FOR ROTARY PLUG VALVES
Filed June 28, 1948  5 Sheets-Sheet 3
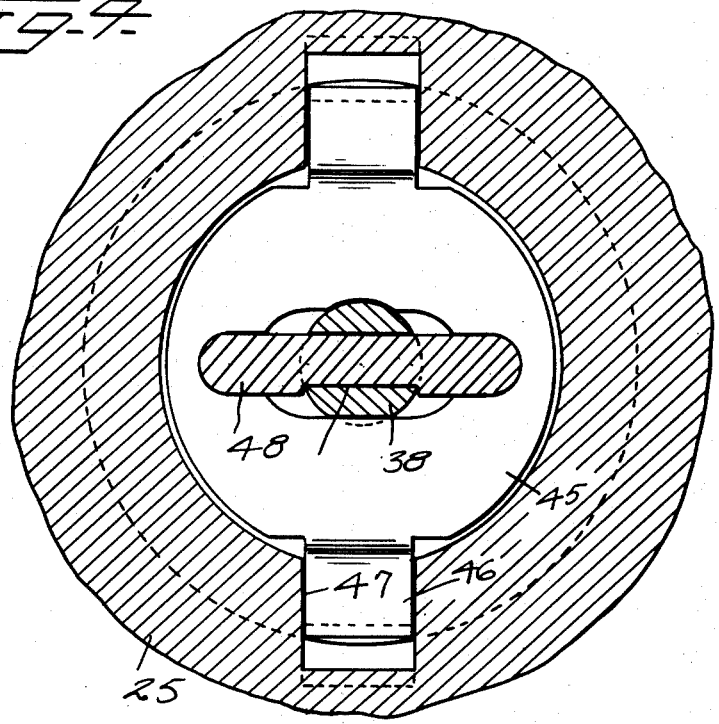
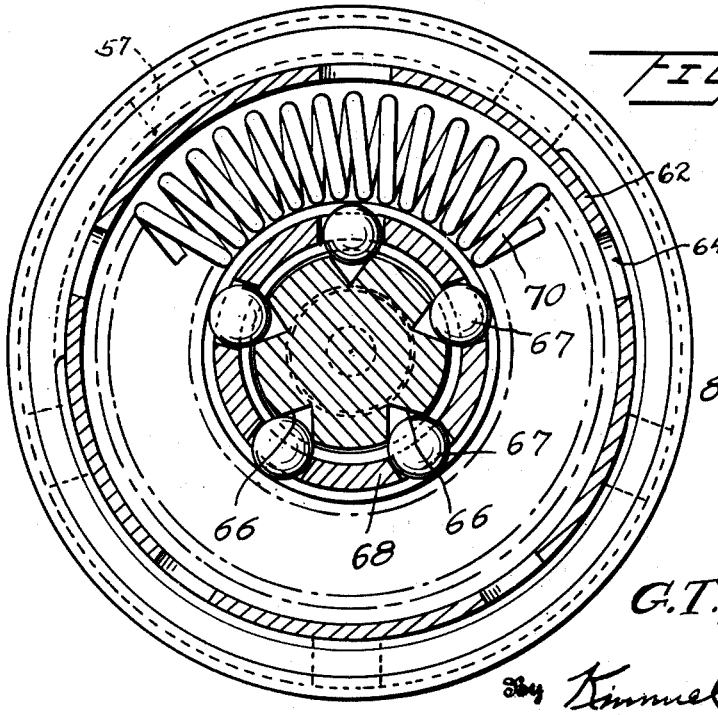
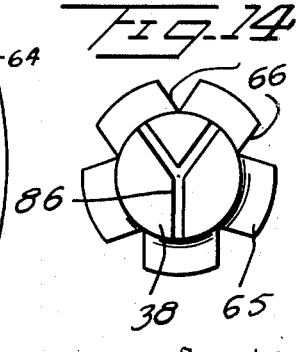
Inventor
G. T. Downey
By Kimmel & Crowell
Attorneys Dec. 30, 1952 G. T. DOWNEY 2,623,724
SEAT FOR ROTARY PLUG VALVES
Filed June 28, 1948 5 Sheets-Sheet 4
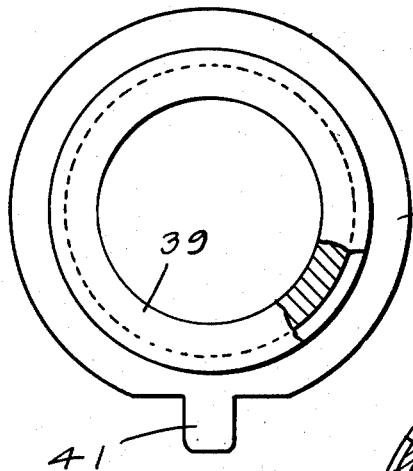
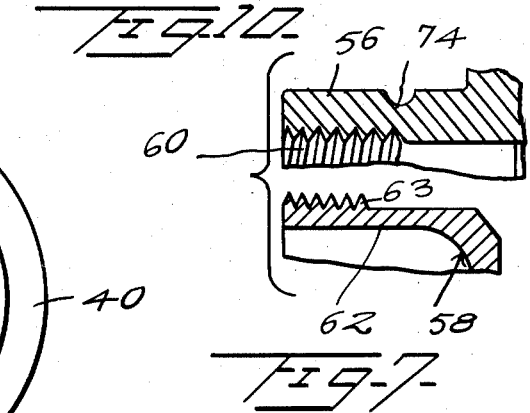
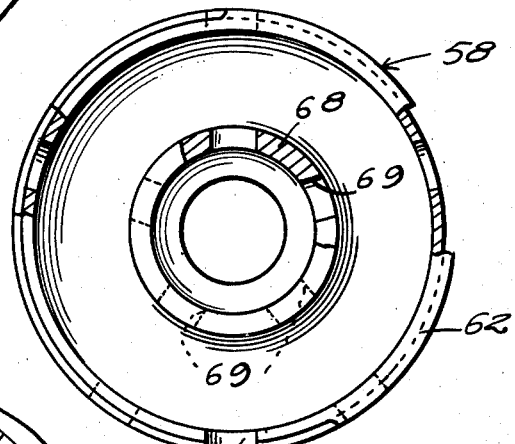
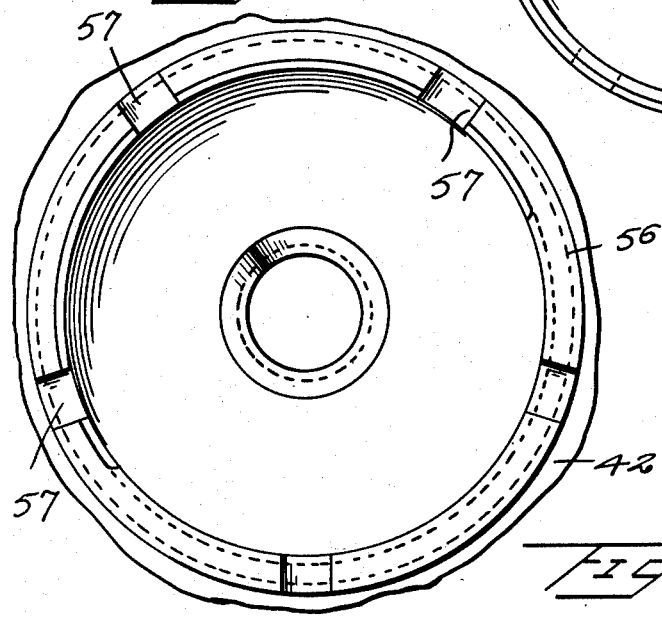
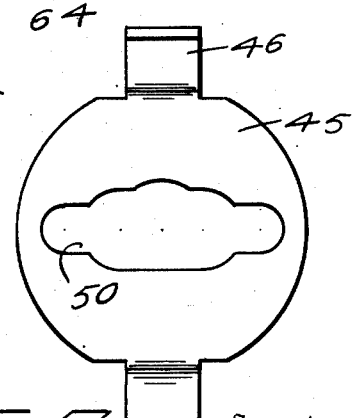
Inventor
G.T. Downey
By Kimmel & Crowell
Attorneys Dec. 30, 1952  G. T. DOWNEY  2,623,724
SEAT FOR ROTARY PLUG VALVES
Filed June 28, 1948  5 Sheets-Sheet 5
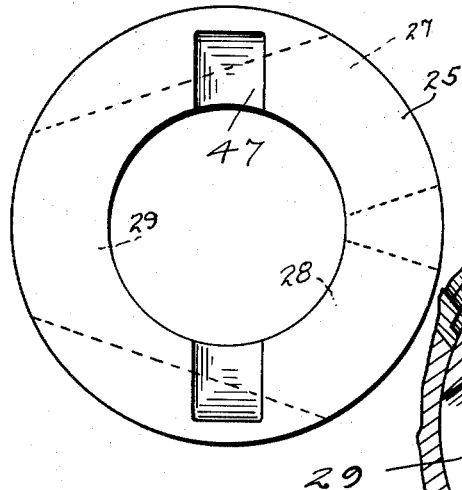
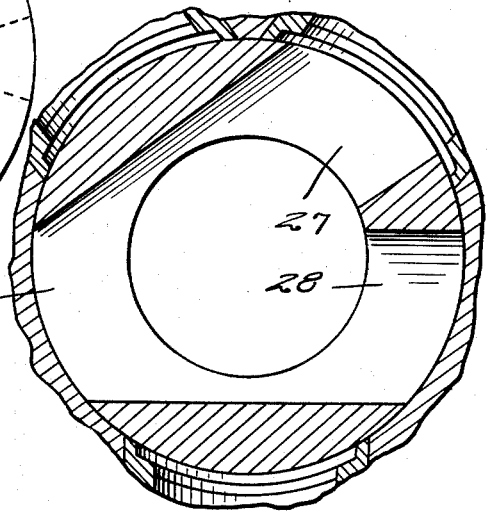
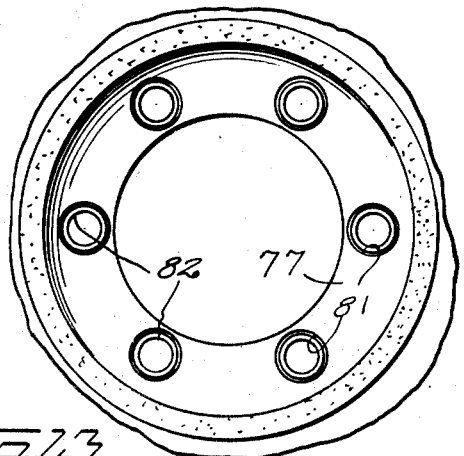
Inventor
G. T. Downey
By Kimmel & Crowell
Attorneys Patented Dec. 30, 1952

2,623,724

UNITED STATES PATENT OFFICE 2,623,724

SEAT FOR ROTARY PLUG VALVES

George T. Downey, Corry, Pa., assignor to Aero Supply Mfg. Co., Inc., Corry, Pa.

Application June 28, 1948, Serial No. 35,562

2 Claims. (Cl. 251—113)

This invention relates to valves.

An object of this invention is to provide a valve having a cylindrical plug formed with a plurality of ports which are adapted to be selectively positioned in registry with selected ports carried by the housing, the housing having improved radially disposed cylindrical bushings or seals in each port to prevent leakage of fluid about the plug.

Another object of this invention is to provide a multiport valve assembly having a rotary valve plug, and an improved indexing means for selectively rotating the plug.

A further object of this invention is to provide in a multi-port valve assembly an improved indexing means which is rotatably carried by one head or end of the valve housing and includes a disconnectible coupling for coupling the indexing shaft with the plug, so that the latter may be left in the housing when the index head is removed, or the index head may be left on the housing and the plug removed from the housing from the opposite end. The design of this coupling is such that a high degree of concentricity between the drive shaft and the plug is not required, the coupling acting as a flexible joint between the shaft and plug.

In the present embodiment of this invention the housing is formed with three ports and the valve plug is also formed with three ports. The plug may be adjusted so as to provide communication between all three ports at the same time, or may be adjusted to provide communication between only a selected pair of ports.

A further object of this invention is to provide an improved means for maintaining an even spring tension on the port seal of the housing.

A further object of this invention is to provide an improved means for equalizing pressures, both internal and external, on the valve plug so that the plug can be freely adjusted under varying pressures and temperatures.

With the above and other objects in view, my invention consists in the arrangement, combination and details of construction disclosed in the drawings and specification, and then more particularly pointed out in the appended claims.

Figure 2:
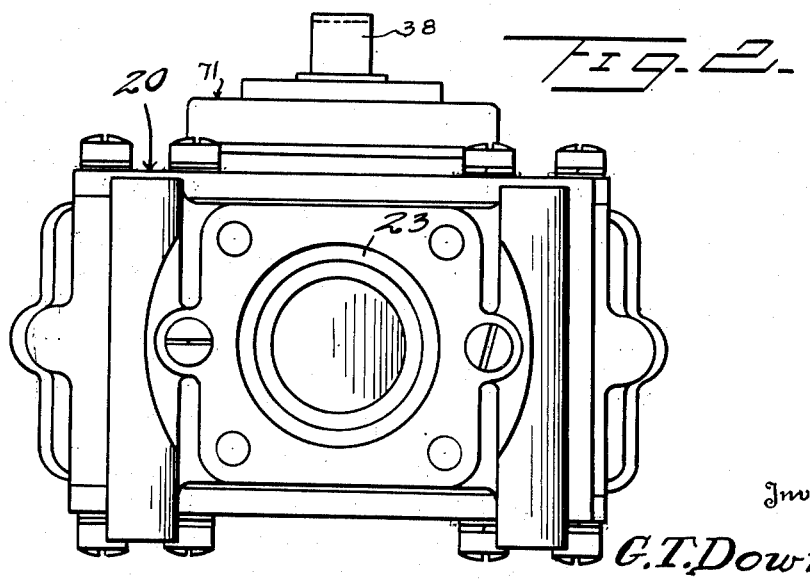

In the drawings,

Figure 1 is a detail front elevation of a valve constructed according to an embodiment of this invention, Figure 2 is a bottom plan view of the device, Figure 3 is a sectional view taken on the line 3—3 of Figure 1, Figure 4 is a fragmentary sectional view taken on the line 4—4 of Figure 3, Figure 5 is a sectional view taken on the line 5—5 of Figure 3, Figure 6 is a detail front elevational of the plug shaft bearing, Figure 7 is a detail front elevation partly broken away of the index cage, Figure 8 is a detail front elevation of one head of the valve housing, Figure 9 is a detail front elevation of the couping plate between the shaft and the plug, Figure 10 is a fragmentary exploded view showing portions of the cage and the front head, Figure 11 is a detail front elevation of the cylindrical plug, Figure 12 is a fragmentary sectional view taken substantially on the line 12—12 of Figure 3, Figure 13 is a fragmentary end elevation of one of the fluid ports, Figure 14 is a detail end elevation of the index and operating shaft for the valve plug, Figure 15 is a detail end elevation of the port seal embodied in the structure shown in Figure 3.

Referring to the drawings, the numeral 20 designates generally a valve housing which is formed with bosses 21, 22 and 23 for connection with fluid lines so as to communicate the interior of the housing 20 with such fluid lines. The housing 20 is formed with a cylindrical bore 24 within which a cylindrical valve plug 25 is rotatably mounted. The three bushings defining fluid ports herein disclosed are arranged with one pair 72° apart and the third bushing arranged 144° from the pair of ports, the purpose for which will be hereinafter described.

The valve plug 25 which is formed with a cylindrical bore 26 is open at each end and is formed with three ports 27, 28 and 29 which in one position of the valve plug are adapted to register with the three bushings 21, 22 and 23 respectively.

The housing 20 has secured to one end thereof a head or plate 30 and the head 30 is adapted to be sealed relative to the housing 20 by means of a sealing member 31. A ring-shaped thrust washer 33 is interposed between the inner side of the head plate 30 and the adjacent end of the valve plug 25, and the outer portion of the washer 33 engages against a rear anti-friction bearing means 34 which is seated in the annular groove 35 formed in the housing 20 and held therein by a lock ring 32. A second anti-friction bearing means 36 is also seated in an annular groove 37 formed in the housing 20 adjacent the forward end thereof.

The valve plug 25 is adapted to be adjusted to register selected ones of the ports thereof with selected ones of the ports of the housing 20 by rotation of an operating shaft 38. The shaft 38 rotatably extends through an anti-friction bearing means 39 which is fixedly carried by a plate 40 which, as shown in Figure 6, is provided with a radially and outwardly extending lug or finger 41. The shaft 38 extends loosely through a front head 42 fixed by fastening means 43 to the forward end of the housing 20. The head plate 42 has disposed therein a flanged bearing bushing 44 at the inner side thereof through which the shaft 38 rotatably engages.

A plug coupling plate 45 is secured on the inner end portion of the shaft 38 and is formed with a pair of forwardly divergent fingers or lugs 46 which engage in cut-outs 47 formed in the forward end of the plug 25. The plate 45 is removably mounted on the inner portion of the shaft 38 by means of a key 48 which extends through a slot 49 formed in the inner end of the shaft 38 and the key 48 is adapted to seat in an elongated opening 50 formed in the plate 45.

The head plate 42 is adapted to be sealed relative to the housing 20 by means of a sealing ring 53 and a thrust washer 55 is interposed between the inner side of the head plate 42 and the forward end of the valve plug 25, with the ring 55 also bearing against the forward antifriction bearing 36. Bearing 36 is locked in groove 37 by means of a lock ring 54.

The head plate 42 is formed with a cylindrical boss 56 which, as shown in Figure 8, is formed with a plurality of radially arranged and circumferentially spaced apart notches 57 which are equally spaced apart and provide a means whereby the index cage generally designated as 58 may be rotatably adjusted to compress a sealing ring 59 between the inner side of the cage 58 and the head plate 42, the sealing ring 59 engaging about the shaft 38.

The boss 56 is internally threaded as indicated at 60, and the cage 58 which includes an inner wall 61 and a cylindrical side wall 62 is externally threaded as indicated at 63, so that the cage 58 may be endwise adjusted within the boss 56. The cage 58 is provided with a single notch 64 in the side wall 62 thereof within which the lug or finger 41 is adapted to engage, the lug extending through the notch 64 for engagement within one of the notches 57 of the boss 56.

The shaft 38 is formed between the ends thereof with an enlargement 65 disposed within the area of the cage 58, and this enlargement 65 is formed with a plurality of V-shaped slots 66 within which index balls 67 are adapted to engage. The cage 58 is formed with a cylindrical boss 68 having circumferentially spaced openings 69 within which the index balls 67 are adapted to loosely engage, the balls 67 projecting from the slots 66 into the openings 69 and partly projecting through the latter openings.

A ring-shaped ball retainer spring 70 is disposed about the cylindrical boss 68 and is adapted to yieldably hold the balls 67 in the slots 66. When the shaft 38 is rotated, the balls 67 will be forced radially outwardly, spreading the associated convolutions of the retainer spring 70, and when the shaft 38 has been rotated a distance equal to the space between the pair of ports, the balls 67 will drop into the next slots 66 which are brought into registry therewith. The provision of the slotted enlargement or nib 65 and the coiled retainer spring 70 permits the balls 67 to rotate relative to the walls of the slots and the retainer thus reducing the wear on these parts.

The plate 40 has secured thereto a flexible flanged dust cap 71 formed with an outer cylindrical skirt 72 having a bead 73 engaging in an annular groove 74 which is formed in the cylindrical boss 56. When it is desired to adjust the compression of seal 59, the skirt 72 of cap 71 is released from the bushing 56 and the plate 40 moved outwardly a slight distance until finger 41 is disengaged from a notch 57 of bushing 56. Plate 40 is then rotated so as to inwardly thread cage 58 and bring the finger 41 into registry with another notch 57. After cage 58 has been rotatably adjusted for one or more of the notches 57, and seal 59 has been compressed to the desired degree to prevent leakage, shaft 38 may be reversely rotated to bring valve plug 25 back to its normal position which obtained prior to the adjustment of valve cage 58. In other words, if plate 40 is rotated from one notch 57 to the next notch 57, shaft 38 will be reversely rotated the same distance.

The outer or forward end of shaft 38 is formed with a Y-shaped groove 86 as shown in Figure 15, so that the user of this valve will be able to visually determine the exact position of valve plug 25. It will be understood that the shaft 38 may have secured thereto an operating handle or lever and a stationary index plate may be associated with such handle or operating lever.

Key 48 is held against inward movement by means of a transversely extending pin 101 which extends across the slot 49 and the pin 101 is limited in its endwise movement by means of a cotter pin 102 extended through the pin 101 between the sides of the slot 49.

The housing 20 has associated therewith a plurality of plug sealing members which include a cylindrical port seal 103 slidable in the port 76. The port seal 103 is formed with a reduced outer end portion 104 forming a shoulder 105, and a spring seat ring 106 is pressed onto the reduced portion 104 and bears at its inner end against a flexible diaphragm or ring 107 which is interposed between the inner end of the spring seat ring 106 and the shoulder 105. The resilient or flexible ring 107 is adapted at its outer portion to seat on a diaphragm seat 108 formed in the boss 23 and the diaphragm 107 is tightly secured on the seat 108 by means of a cylindrical member 109 carried by a coupling plate 110 which is fixed to the outer end of the boss 23. The spring seat member 106 is formed with a plurality of circumferentially spaced apart notches or seats 111 within which springs 112 are adapted to engage. The outer ends of the spring 112 bear against the plate 110.

In the use and operation of this device, the valve housing 20 is adapted to be coupled to at least three fluid carrying lines, and as an example, the bosses 21 and 22 may be connected to two gasoline tanks, whereas the boss 23 may be connected to an airplane engine or the like. If it is desired to communicate the two tanks with the engine, the valve plug 25 is adjusted so that ports 27 and 28 will register with bosses 21 and 22. If it is desired to communicate only one of the bosses with boss 23, plug 25 is adjusted by rotating index shaft 38 in the desired direction, the Y groove 86 indicating the exact position of the plug 25. In other words, branch 113 which communicates with branch 114 may be disposed in alignment with boss 21 and at this time branch 114 will be in alignment with boss 23. Branch 115 of groove 86 will be disposed to the left of boss 21 so that boss 22 will be cut off and fluid will only pass from boss 21 to boss 23 or vice versa. Boss 22 may be communicated with boss 23 with boss 21 cut off by rotating shaft 38 so that branch 114 will be in alignment with boss 22 and branch 115 will be in alignment with boss 23. At this time branch 113 will be to the left of boss 23 and boss 21 will be cut off. Communication between ports or bosses 21 and 22 and port or boss 23 may be cut off by rotating shaft 38 to the position shown in Figure 1 wherein branch 115 is in alignment with port or boss 22 and branches 113 and 114 are out of alignment with both bosses or ports 21 and 23.

The seals 103 are so designed as to have an effective area at their inner ends where these seals contact the outer surface of the valve plug which is substantially equal to the effective area of seal member 107. This design produces a substantial balance of effective seal areas and eliminates the necessity of high spring loads urging the seals against the valve plug so that the plug being under relatively low spring pressure can be rotated more easily.

I do not mean to confine myself to the exact details of construction herein disclosed, but claim all variations falling within the purview of the appended claims.

I claim:

1. A valve structure comprising a housing having a plurality of radially arranged ports, a ported valve plug rotatable in said housing, a cylindrical sealing ring slidable in each port and bearing at its inner end against said plug, said ring including an outer port formed with a plurality of spring sockets, springs engaging in said sockets, a combined connector and spring compression plate secured to said housing at the outer end of each port, and sealing means contacting the wall of each port and fixed relative to each ring in said port, said sealing means having an effective area substantially equal to the area of contact between said ring and plug.

2. A valve structure comprising a housing having a plurality of radially arranged ports, a ported valve plug rotatable in said housing, a cylindrical sealing ring slidable in each port and bearing at its inner end against said plug, said ring being formed of inner and outer parts, a seal fixed relative to each ring and in sealing contact with the wall of a port, said outer part being formed with a plurality of spring sockets, springs in said sockets, and a combined connector and spring compression plate secured to said housing at the outer end of each port, said seal having an effective sealing area substantially equal to the area of contact between said inner part and said plug.

GEORGE T. DOWNEY.

REFERENCES CITED

The following references are of record in the file of this patent:

UNITED STATES PATENTS

| Number | Name | Date |
|---|---|---|
| 359,131 | Clark | Mar. 8, 1887 |
| 1,079,847 | Dunkel | Nov. 25, 1913 |
| 1,671,255 | Porter | May 29, 1928 |
| 2,191,232 | Heinen | Feb. 20, 1940 |
| 2,390,201 | Bredenbeck | Dec. 4, 1945 |
| 2,416,814 | Borse | Mar. 4, 1947 |
| 2,419,481 | Carbon | Apr. 22, 1947 |
| 2,466,098 | Grebmeier | Apr. 5, 1949 |
| 2,472,652 | Downey | June 7, 1949 |
| 2,520,288 | Shand et al. | Aug. 29, 1950 |
| 2,548,128 | Snyder | Apr. 10, 1951 |

FOREIGN PATENTS

| Number | Country | Date |
|---|---|---|
| 23,939 | France | of 1921 |
| 174,749 | Switzerland | Apr. 16, 1935 |